(12) United States Patent
Chandra et al.

(10) Patent No.: US 6,782,408 B1
(45) Date of Patent: Aug. 24, 2004

(54) CONTROLLING A NUMBER OF INSTANCES OF AN APPLICATION RUNNING IN A COMPUTING ENVIRONMENT

(75) Inventors: Tushar Deepak Chandra, New York, NY (US); Sameh Afif Fakhouri, New Rochelle, NY (US); Liana Liyow Fong, Irvington, NY (US); William Francis Jerome, Amawalk, NY (US); Srirama Mandyam Krishnakumar, Mont Kisco, NY (US); Vijay Krishnarao Naik, Yorktown Heights, NY (US); John Arthur Pershing, Jr., Buchanan, NY (US); John Joseph Edward Turek, South Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,334

(22) Filed: Mar. 30, 1999

(51) Int. Cl.[7] .................................................. G06F 9/46
(52) U.S. Cl. ........................ 709/104; 718/100; 718/104; 709/224; 709/229; 709/226
(58) Field of Search ................................ 709/224, 226, 709/229, 100, 104, 105

(56) References Cited

U.S. PATENT DOCUMENTS

| | | | | |
|---|---|---|---|---|
| 5,023,907 A | * | 6/1991 | Johnson et al. | 710/200 |
| 5,249,290 A | * | 9/1993 | Heizer | 709/105 |
| 5,579,222 A | * | 11/1996 | Bains et al. | 717/167 |
| 5,671,412 A | * | 9/1997 | Christiano | 707/104.1 |
| 5,675,739 A | | 10/1997 | Eilert et al. | 395/200.11 |
| 5,905,860 A | * | 5/1999 | Olsen et al. | 713/201 |
| 6,026,404 A | * | 2/2000 | Adunuthula et al. | 707/10 |
| 6,327,622 B1 | * | 12/2001 | Jindal et al. | 709/105 |
| 6,425,005 B1 | * | 7/2002 | Dugan et al. | 709/223 |

OTHER PUBLICATIONS

A.K. Iyengar, "Method for Dynamically Routing Web Requests to Different Web Servers," IBM Technical Disclosure Bulletin, vol. 40, No. 12, Dec. 1997, pp. 5–8.

J.R. Lewis, "Providing Distributing Computing Environment Servers on Client Demand," IBM Technical Disclosure Bulletin, vol. 38, No. 03, Mar. 1995, pp. 231–233.

L.F. Menditto, J. Skogman and G. Sunday, "Single System Image and Load Balancing for Network Access to a Loosely Coupled Complex," IBM Technical Bulletin, vol. 34, No. 9, Feb. 1992, pp. 464–467.

* cited by examiner

Primary Examiner—Meng-Al T. An
Assistant Examiner—Lilian Vo
(74) Attorney, Agent, or Firm—Douglas W. Cameron, Esq.; Wayne F. Reinke, Esq.; Heslin Rothenberg Farley & Mesiti P.C.

(57) ABSTRACT

The number of instances of an application running in a computing environment are controlled by monitoring the current load on the application, and altering the current number of instances of the application based on results of the monitoring. The load may be monitored by monitoring the current number of instances of the application running in the computing environment. Where a maximum, minimum and/or initial number on startup, of instances of the application are specified, the altering is done based on comparing the current number to one or more of the specified numbers of instances.

15 Claims, 4 Drawing Sheets

CONTROLLING A NUMBER OF INSTANCES OF AN APPLICATION RUNNING IN A COMPUTING ENVIRONMENT

BACKGROUND OF THE INVENTION

1. Technical Field

The present invention generally relates to application management in a computing environment. More particularly, the present invention relates to controlling a number of instances of an application running in a computing environment.

2. Background Information

Computing environments typically have some mechanism for managing the resources of that environment. One example of a computing environment that manages resources is a clustered environment. As is known, a cluster is a high-bandwidth connected set of computers which serve to run applications that are to be highly available. Clusters are used for deploying various applications, and examples include database servers and web servers. These applications make use of cluster resources, such as disks, network adapters, IP addresses, operating system services and application software. Clustered environments include cluster managers, which are responsible for managing the resources of the cluster.

In managing the resources, the cluster manager recognizes various constraints associated with the individual resources. These constraints relate resources to each other and specify the parameters of the individual resource with which it is associated.

In the past, such computing environments have not controlled the number of instances of a given application that is running. The ability to control the number of instances allows for responding to changes in loads on individual applications, thereby making more efficient use of resources.

Thus, a need exists for a way to control the number of instances of an application running in a computing environment.

SUMMARY OF THE INVENTION

Briefly, the present invention satisfies the need for a way to control the number of instances of an application running in a computing environment by specifying limits on the number of instances, monitoring the current number of instances running, and altering that number based on the limits.

In accordance with the above, it is an object of the present invention to provide a way to control a number of instances of an application running in a computing environment.

The present invention provides, in a first aspect, a method of controlling a number of instances of an application running in a computing environment. The method comprises monitoring a current load on an application running in the computing environment, and altering a current number of instances of the application running in the computing environment based on results of the monitoring. The monitoring may comprise monitoring the current number of instances of the application. At least one of a maximum, minimum, and initial number on startup, of instances of the application may be specified.

The present invention provides, in a second aspect, a system for performing the method of the first aspect.

The present invention provides, in a third aspect, an article of manufacture, comprising at least one computer usable medium having computer readable program code means for causing a computer to perform the method of the first aspect.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
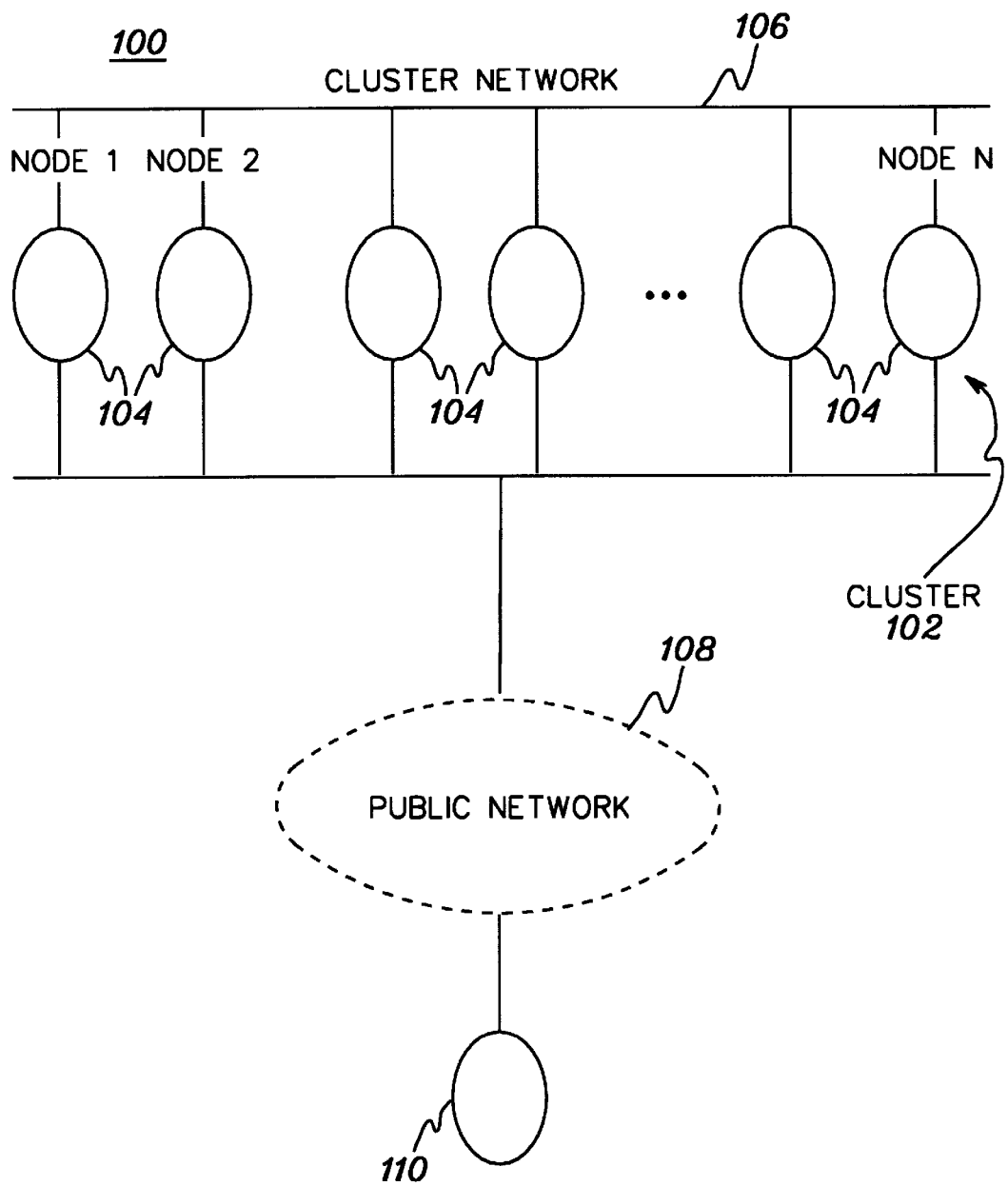
FIG. 1 depicts one example of a computing environment incorporating and using the capabilities of the present invention.

One embodiment of a computing environment incorporating and using the capabilities of the present invention is depicted in FIG. 1. In one example, computing environment 100 is a distributed computing environment having a cluster 102. Cluster 102 includes one or more computing nodes 104. Each computing node, is for instance, a UNIX workstation having at least one central processing unit, storage facilities and one or more input/output devices. Each central processing unit executes an operating system, such as AIX offered by International Business Machines Corporation.

Computing nodes 104 are coupled to one another by a cluster network 106, which is, for example, a high-speed local area network (LAN). One example of this type of LAN is the high-speed switch of the RS/6000 SP, offered by International Business Machines Corporation.

In this example, cluster 102 is coupled to a public network 108 to enable the cluster to provide services to one or more computing units 110 outside the cluster. Computing unit 110 is, for example, a UNIX workstation, or any other type of computer or computing unit.

The computing environment described above is only one example of a computing environment incorporating and using the capabilities of the present invention. The capabilities of the present invention are equally applicable to various types of computing environments, including, but not limited to, homogeneous computing environments, heterogeneous computing environments, other types of distributed environments, and environments that do not include public networks. Further, the computing nodes may be other than UNIX workstations, or they may be any other types of computers or computing units. Additionally, the operating system need not be AIX. Further, one or more of the computing nodes of the cluster may be different types of computing nodes than the others (e.g., different hardware) and/or run different types of operating systems. Likewise, the computing units may be the same or different from the computing nodes and may be the same or different from each other. The above described environment is offered as only one example.

The cluster is used to run, for instance, critical programs (applications) which require high availability. Examples of these applications include database servers, Enterprise Resource Planning (ERP) systems and servers for global computer networks such as, for example, the World Wide Web portion of the Internet (also referred to as "Web servers"). These applications are also referred to herein as resources, which run on the nodes in the cluster. These applications can also depend on other types of resources, such as other applications, operating system services, disks, file systems, network adapters, IP addresses and communication stacks, to name just a few examples.

A resource is an abstraction of a hardware component (e.g., a network adapter) and/or a software component (e.g., a database server). The abstraction allows resources to be defined/undefined and allows for the manipulation of the resources and for relationships to be created. One resource may have a relationship with one or more other resources of the computing environment. The relationship may be, for instance, a dependency relationship, in which one resource is dependent on one or more other resources. For example, a payroll application may depend on a database server, and as such, the database server has to be ready before the payroll application can be brought online. Another type of a relationship may be a location relationship. For example, sometimes, resources that have a relationship with one another need to run on the same computing node. As another example, if an application, such as a database application, needs direct access to physical disks, then the application can only be run on those computing nodes having physical disks connected thereto.

Figure 2:
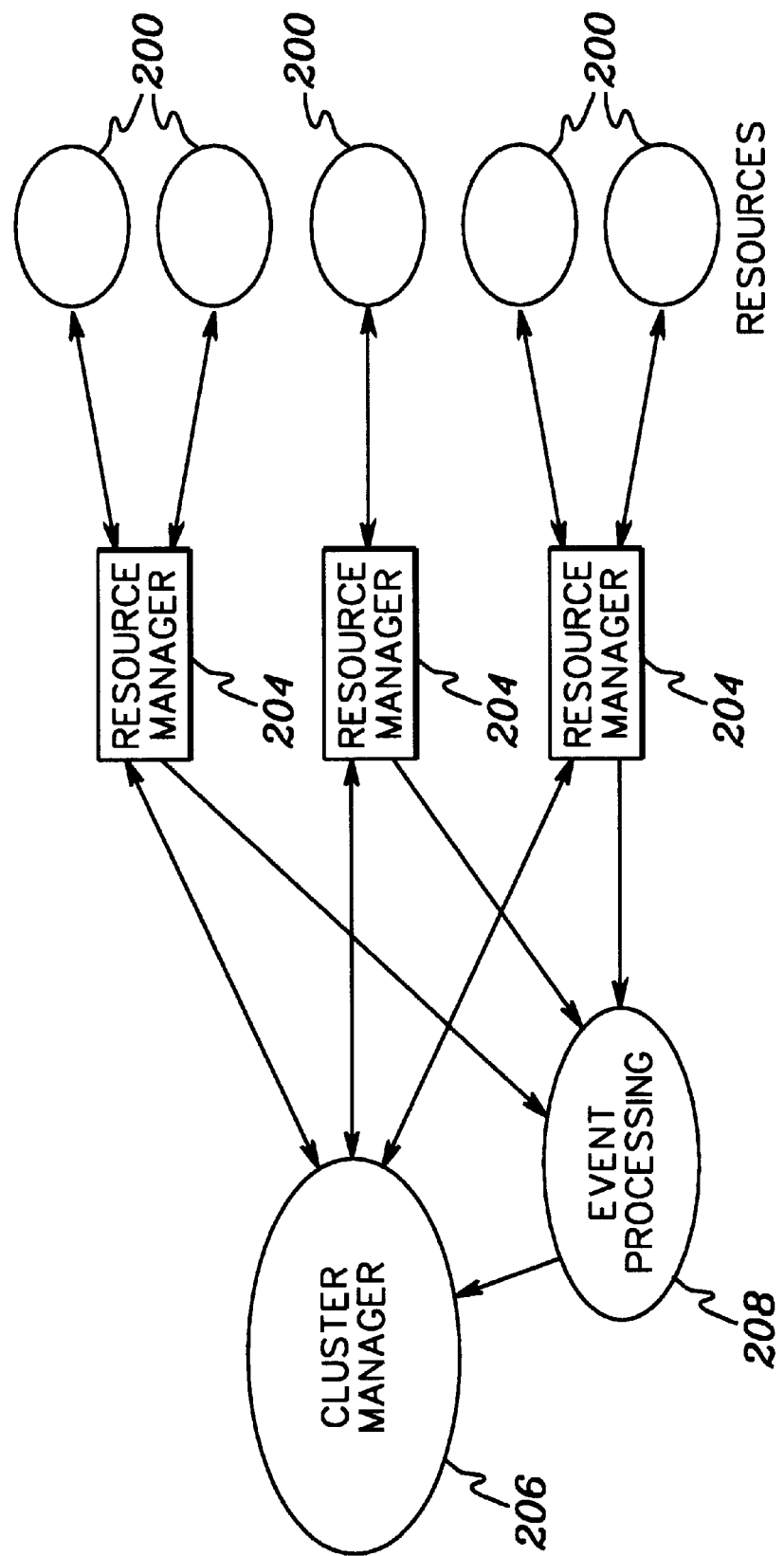
FIG. 2 depicts one embodiment of a logical organization of the computing environment of FIG. 1.

As depicted in FIG. 2, each resource 200 has associated therewith a resource manager 204. (It should be noted, however, that not all resources of a computing environment need a resource manager.) One resource manager can interact with one or more resources. Each resource manager 204 provides an interface to other entities that wish to inform the resource manager, for instance, that a resource is to be brought online of offline. The resource manager is responsible for knowing the details of the resource and for invoking resource specific actions.

Additionally, the resource manager is responsible for monitoring the state of the resource. For example, when a resource fails (or goes offline), it is the responsibility of the resource manager to notify any entity that is interested in knowing about the state of the resource.

In accordance with the principles of the present invention, the resource managers, and in particular, the resource manager interfaces are coupled to at least one cluster manager 206. Cluster manager 206 is the entity which manages the resources in the cluster. It manages a resource by operating on its abstraction to query or change its state or other attributes. The cluster manager typically runs on one of the nodes in the cluster, but could run anywhere in the distributed system. One example of a cluster manager is the High-Availability Cluster Multiprocessing (HACMP) offered by International Business Machines Corporation.

The cluster manager has the task of maintaining the availability of the resources (i.e., having them online) and ensuring that the resources provide the desired quality of service. The cluster manager monitors the resources in the cluster using, for example, an event processing facility 208, coupled thereto.

Event processing facility 208 allows resource managers 204 to publish events (e.g., resource status) that could be of interest to other entities in the distributed system. It then sends these events to entities that are interested in the events. The event processing facility decouples publishers from subscribers, so that the publishers need not know the subscribers. One example of an event processing facility is described in IBM PSSP Event Management Programming Guide and Reference, IBM Pub. No. SC23-3996-01, Second Edition (August 1997), which is hereby incorporated herein by reference in its entirety.

The cluster manager has a global view of all the resources, their states and the relationships among them. Thus, a cluster manager arrives at certain decisions by utilizing information that may not be known to the resource. The cluster manager maintains a relationship tree, which includes one or more of the resources of the computing environment and the constraints that interrelate them. This is described more fully in commonly assigned U.S. patent application Ser. No. 09/280, 531, entitled "Method, System and Program Products for Managing the Checkpointing/Restarting of Resources of a Computing Environment," filed the same day as the present application, and which is hereby incorporated by reference in its entirety.

Figures 3, 4:
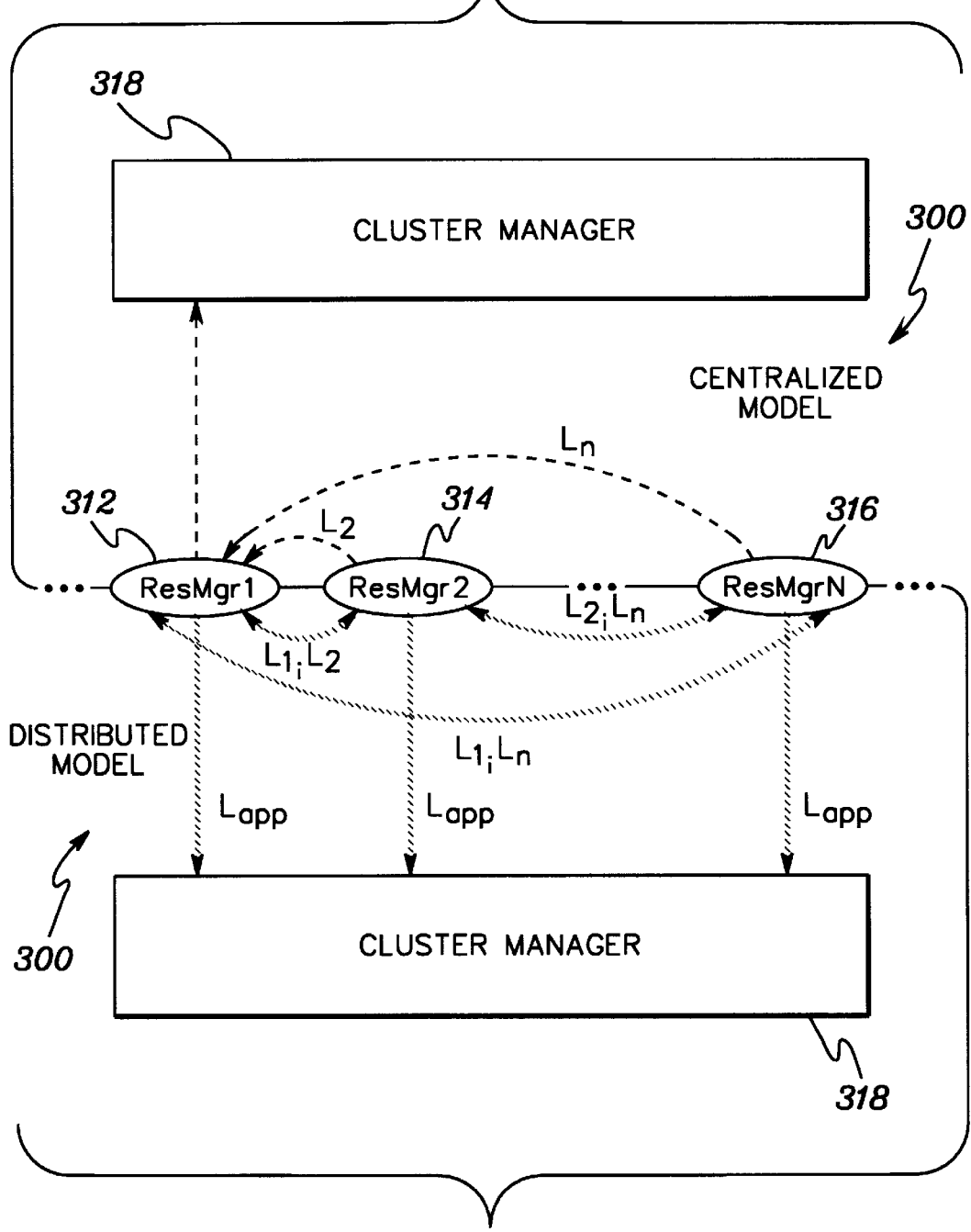
FIG. 3 is a block diagram showing the flow of data for application load computation in a clustered environment, in accordance with one embodiment of the present invention.
FIG. 4 is another block diagram showing the flow of data for application load computation in the clustered environment of FIG. 3, in accordance with a second embodiment of the present invention.

FIG. 3 is a block diagram showing the flow of data for application load computation in a computer cluster environment 300 in accordance with a centralized model embodying the present invention. Each instance of an application (i.e., each instance of a software server) running in the cluster has a resource manager, e.g., ResMgr's 312, 314 and 316, that can be instructed by cluster manager 318 to start or stop the application. Each resource manager periodically computes a load L representing an application specific load value experienced by a given application. Examples of load calculations include a Web server counting the number of hits (i.e., the number of Web page requests coming to the Web server) it is experiencing per second for a given Web site page, the number of transactions per second in a database management system, or the response time of transactions in a database management system.

In the centralized model, a resource manager is designated or elected to perform a computation to get an overall load value $L_{app}$ for a given application based on the individual loads computed by the resource managers. In FIG. 3, resource manager 312 computes the overall load and supplies it to cluster manager 318 after receiving the individual load values from resource managers 314 and 316. To receive the individual load values, the designated resource manager could request the data from the other resource managers whenever needed to perform the computation, or the other resource managers could periodically send their L's to the designated resource manager.

FIG. 4 is a block diagram showing the flow of data for application load computation in the computer cluster environment 300 of FIG. 3 in accordance with a distributed model embodying the present invention. In the distributed model, each resource manager performs the computation of Lapp based on all the individual loads L computed by the resource managers. Thus, each resource manager exchanges L's with all other resource managers. As with the centralized model, each resource manager could either request the L's from the others whenever prepared to compute Lapp, or periodically each resource manager could broadcast its load value to the other resource managers.

In both the centralized and distributed models, the computation of $L_{app}$ will be an average of all the individual load values over a predetermined time interval. It should be noted that $L_{app}$ is a number that is relevant to the application itself and may or may not be compared with load values computed by the resource managers of other applications. Examples of load values include response time, service waiting time, service queue length, and utilization.

As set forth above, the cluster manager has various constraints associated with individual resources. An "InstancesOf" constraint, as described below, is one of those constraints. The InstancesOf constraint specifies a minimum and maximum number of instances of the application to be running in the cluster, as well as an initial number of instances of the application to be run at startup. For example, a minimum number might be one, and a maximum number might be equal to the number of nodes in the computing environment. However, it will be understood that more than one instance could be running on a given node.

The information making up an InstancesOf constraint, as well as other constraints for a given application, is given to the cluster manager by either a system administrator, or a resource manager associated with the application. In some cases, an application could act as its own resource manager, if the code for a resource manager were embedded within the application. Once such information is received by the cluster manager, data structures are created for reference.

Also specified in the information given to the cluster manager are a High Load Trigger (HLT) and a Low Load Trigger (LLT), which are predetermined high and low values, respectively, for the overall load computation $L_{app}$. If the HLT is reached and sustained for a predetermined period of time (specified by a High Load Re-Arm Timer or HLRAT), then the cluster manager is triggered to create one or more instances of the application. How many instances are created and where they are placed are not relevant to the present invention, except to the extent that the number created should not result in more instances running than the maximum specified. Similarly, if the LLT is reached and sustained for a predetermined period of time (specified by a Low Load Re-Arm Timer or LLRAT), then the cluster manager is triggered to remove one or more instances of the application. How many instances are removed and from where is also not relevant to the present invention, except to the extent that the number removed should not result in less instances running than the minimum specified.

Figure 5:
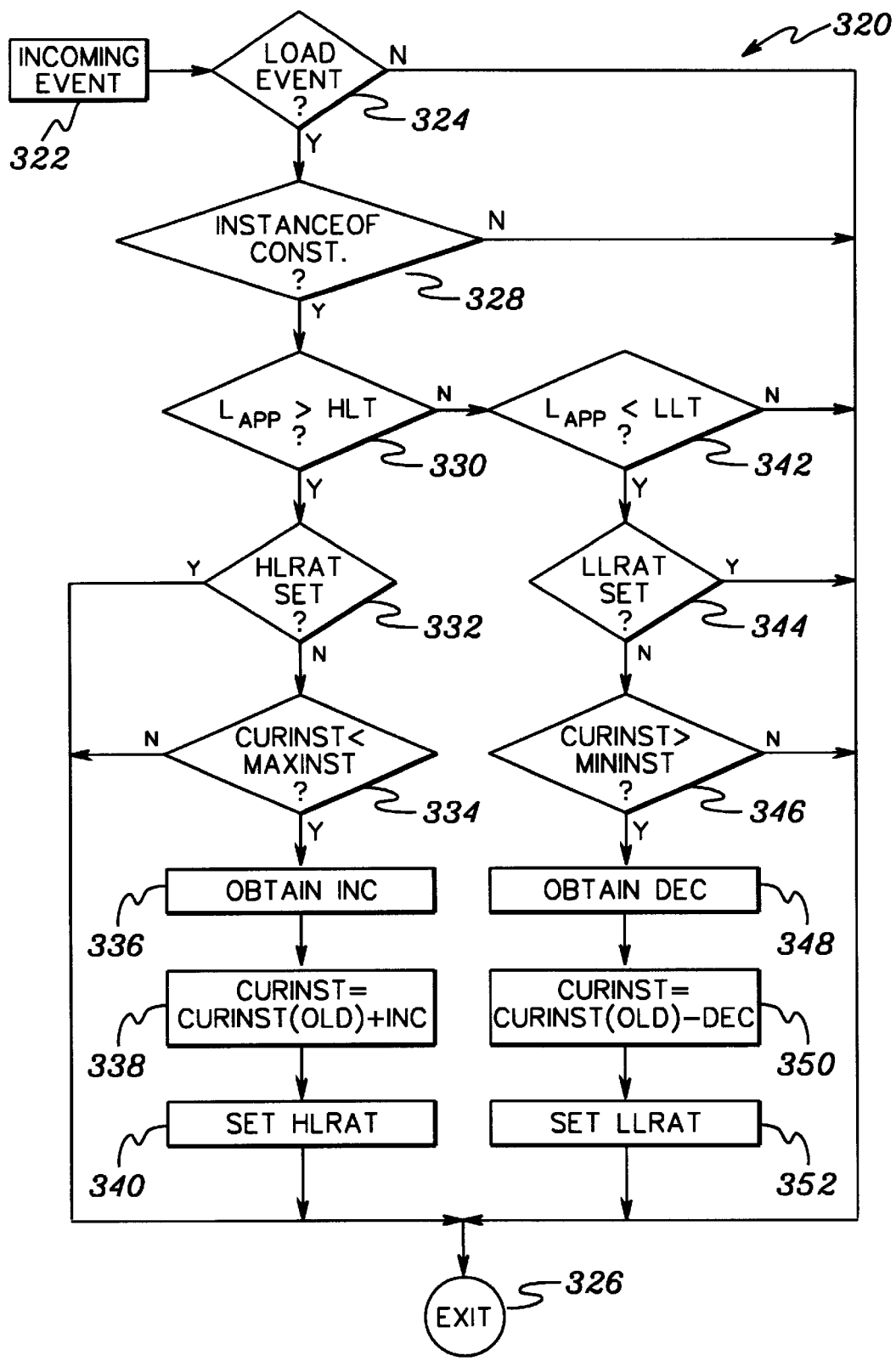
FIG. 5 is a flow diagram describing the processing of a load event in the computing environment of FIGS. 3 and 4.

FIG. 5 is a flow diagram 320 of the processing of a load event by the cluster manager in FIGS. 3 and 4. An incoming event 322 is first checked to determine if it is a load event (STEP 324, "LOAD EVENT?"). If the event is not a load event, then the cluster manager exits 326 the load event processing routine. If the event is a load event, then the cluster manager checks to see if the application has an InstancesOf constraint associated with it (STEP 328, "INSTANCESOF CONSTRAINT?"). This is done by querying the data structure for that application. If there is no InstancesOf constraint associated with the application, then the cluster manager exits 326 the routine. If there is an associated InstancesOf constraint, then the cluster manager checks if the overall load $L_{app}$ reported to the cluster manager is greater than the HLT specified (STEP 330, "$L_{app}$>HLT?").

If the overall load $L_{app}$ is greater than the HLT specified, then the cluster manager checks to see if the HLRAT is set (STEP 332, "HLRAT SET?"). If the HLRAT is set, then all HLT events are ignored until the timer expires. The timer allows time, specific to the application at hand, for previous action taken (e.g., adding or removing instances) based on monitoring the load on a given application. The amount of time for both timers is part of the information received by the cluster manager and placed in the data structure for that application. If the HLRAT is not set, the routine checks to see if the Current Number of Instances (CurInst) is less than the Maximum Number of Instances (MaxInst) specified in the InstancesOf constraint (STEP 334, "CURINST<MAXINST?"). The current number of instances is tracked by the resource manager associated with the application. If the current number of instances is not less than the maximum number specified, then the cluster manager exits 326 the routine. If CurInst is less than MaxInst, then more instances of the application can be created.

The cluster manager determines whether to create more instances, and if so, how many instances to create, within the limits set, and where to deploy them. However, the details of this are beyond the scope of this application and not necessary for an understanding of the present invention. Assuming the cluster manager determines to create more instances of the application, the routine obtains the number of the increment (STEP 336, "OBTAIN INC"). At this point, the current number of instances is incremented by that amount (STEP 338, "CURINST=CURINST(old)+INC"), the High Load Re-Arm Timer is set (STEP 340, "SET HLRAT"), and the cluster manager exits 326 the routine.

Returning to inquiry 330, if the overall load $L_{app}$ on the application is not greater than HLT, then the routine checks to see if $L_{app}$ is less than the Low Load Trigger LLT (STEP 342, "$L_{app}$<LLT?"). If $L_{app}$ is less than LLT, then the routine checks to see if the Low Load Re-Arm Timer LLRAT is set (STEP 344, "LLRAT SET?"). Like the HLRAT, if the LLRAT is set, then all LLT events are ignored until it times out. If the LLRAT is not set, the routine checks to see if the current number of instances is greater than the minimum number specified in the InstancesOf constraint (STEP 346, "CURINST>MININST?"). If the current number of instances is not greater than the minimum specified, then the cluster manager exits 326 the routine. If CurInst is greater than MinInst, then the cluster manager can remove instances of the application.

Like the case of adding instances of the application, the cluster manager determines whether to remove instances, and if so, how many instances to remove, within the specified limits, and from where to remove them. However, the details of this are beyond the scope of this application and not necessary for an understanding of the present invention. Assuming the cluster manager determines to remove more instances of the application, the routine obtains the number of the decrement (STEP 348, "OBTAIN DEC"). At this point, the current number of instances is decremented by that amount (STEP 350, "CURINST=CURINST(old)-DEC"), the Low Load Re-Arm Timer is set (STEP 352, "SET LLRAT"), and the cluster manager exits 326 the routine.

For an application that has an InstancesOf constraint associated with it, at application startup time, the cluster manager will start the initial number of instances InitInst specified in the constraint. The choice of which nodes these initial instances are started on is determined by the cluster manager given the dependency tree and/or other information the cluster manager has. The specifics of deployment of the initial instances is not germane to the present invention.

After starting the application, the HLRAT and LLRAT timers will be set to disable the monitoring for the predetermined period. The purpose of this disabling is to allow the application time to get started for there to be some meaningful load information. When these timers expire, the cluster manager will start using the $L_{app}$ value(s) for necessary actions. The cluster manager can obtain the load values either by actively monitoring or passively receiving them.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method of controlling a number of instances of an application running in a computing environment, comprising:
    monitoring a current load on an application running in the computing environment, wherein the current load comprises at least one indicator of a level of usage of available instances of the application, and wherein the monitoring comprises monitoring a current number of instances of the application;
    altering the current number of instances of the application running in the computing environment based on results of the monitoring; and
    specifying a minimum number of instances of the application;
    wherein the monitoring comprises monitoring the current number of instances of the application for falling below the minimum number of instances for at least a predetermined amount of time.

2. The method of claim 1, further comprising increasing the current number of instances running in the computing environment when the current number of instances falls below the minimum number of instances for at least the predetermined amount of time.

3. A method of controlling a number of instances of an application running in a computing environment, comprising:
    monitoring a current load on an application running in the computing environment, wherein the current load comprises at least one indicator of a level of usage of available instances of the application, and wherein the monitoring comprises monitoring a current number of instances of the application;
    altering the current number of instances of the application running in the computing environment based on results of the monitoring; and
    specifying a maximum number of instances of the application;
    wherein the monitoring comprises monitoring the current number of instances of the application for rising above the maximum number of instances at least a predetermined amount of time.

4. The method of claim 3, further comprising decreasing the current number of instances running in the computing environment when the current number of instances rises above the maximum number of instances for at least the predetermined amount of time.

5. A method of controlling a number of instances of an application running in a computing environment, comprising:
    monitoring a current load on an application running in the computing environment, wherein the current load comprises at last one indicator of a level of usage of available instances of the application, and wherein the monitoring comprises monitoring a current number of instances of the application;
    altering the current number of instances of the application running in the computing environment based on results of the monitoring; and
    specifying at least one of a maximum number and a minimum number of instances of the application;
    wherein the computing environment comprises a clustered environment, wherein the clustered environment comprises a cluster manager, wherein the application is associated with a resource manager, wherein the monitoring is performed by the resource manager, the method further comprising providing the current load on the cluster manager; and
    wherein the altering comprises altering the current number of instances of the application based on comparing the current load to one of the maximum number of instances and the minimum number of instances, and wherein the altering and comparing are performed by the cluster manager.

6. A system for controlling a number of instances of an application running in a computing environment, comprising:
    means for monitoring a current load on an application running in the computing environment, wherein the current load comprises at least one indicator of a level of usage of available instances of the application, and wherein the means for monitoring comprises means for monitoring a current number of instances of the application;
    means for altering the current number of instances of the application running in the computing environment based on results of the monitoring; and
    means for specifying a minimum number of instances of the application;
    wherein the means for monitoring comprises means for monitoring the current number of instances of the application for falling below the minimum number of instances for at least a predetermined amount of time.

7. The system of claim 6, further comprising means for increasing the current number of instances running in the computing environment when the current number of instances falls below the minimum number of instances for at least the predetermined amount of time.

8. A system for controlling a number of instances of an application running in a computing environment, comprising:
    means for monitoring a current load on an application running in the computing environment, wherein the current load comprises at least one indicator of a level of usage of available instances of the application, and wherein the means for monitoring comprises means for monitoring a current number of instances of the application;

means for altering the current number of instances of the application running in the computing environment based on results of the monitoring; and means for specifying a maximum number of instances of the application;

wherein the means for monitoring comprises means for monitoring the current number of instances of the application for rising above the maximum number of instances at least a predetermined amount of time.

9. The system of claim 8, further comprising means for decreasing the current number of instances running in the computing environment when the current number of instances rises above the maximum number of instances for at least the predetermined amount of time.

10. A system for controlling a number of instances of an application running in a computing environment, comprising:

means for monitoring a current load on an application running in the computing environment, wherein the current load comprises at least one indicator of a level of usage of available instances of the application, and wherein the means for monitoring comprises means for monitoring a current number of instances of the application;

means for altering the current number of instances of the application running in the computing environment based on results of the monitoring; and means for specifying at least one of a maximum number and a minimum number of instances of the application;

wherein the computing environment comprises a clustered environment, wherein the clustered environment comprises a cluster manager, wherein the application is associated with a resource manager, wherein the means for monitoring comprises the resource manager, the system further comprising means for providing the current load to the cluster manager; and wherein the means for altering comprises means for altering the number of instances of the application based on comparing the current load to one of the maximum number of instances and the minimum number of instances, and wherein the means for altering and comparing comprises the cluster manager.

11. An article of manufacture, comprising:

at least one computer usable medium having computer readable program code means for causing a controlling of a number of instances of an application running in a computing environment, the computer readable program code means in said article of manufacture comprising:

computer readable program code means for causing a computer to monitor a current load on an application running in the computing environment, wherein the current load comprises at least one indicator of a level of usage of available instances of the application, and wherein the computer readable program code means for causing a computer to monitor comprises computer readable program code means for causing a computer to monitor the current number of instances of the application;

computer readable program code means for causing a computer to alter the current number of instances of the application running in the computing environment based on results of the monitoring; and computer readable program code means for causing a computer to specify a minimum number of instances of the application;

wherein the computer readable program code means for causing a computer to monitor comprises computer readable program code means for causing a computer to monitor the current number of instances of the application for falling below the minimum number of instances for at least a predetermined amount of time.

12. The article of manufacture of claim 11, further comprising computer readable program code means for causing a computer to increase the current number of instances running in the computing environment when the current number of instances falls below the minimum number of instances for at least the predetermined amount of time.

13. An article of manufacture, comprising:

at least one computer usable medium having computer readable program code means for causing the controlling of a number of instances of an application running in a computing environment, the computer readable program code means in said article of manufacture comprising:

computer readable program code means for causing a computer to monitor a current load on an application running in the computing environment, wherein the current load comprises at least one indicator of a level of usage of available instances of the application, and wherein the computer readable program code means for causing a computer to monitor comprises computer readable program code means for causing a computer to monitor the current number of instances of the application;

computer readable program code means for causing a computer to alter the current number of instances of the application running in the computing environment based on results of the monitoring; and computer readable program code means for causing a computer to specify a maximum number of instances of the application;

wherein the computer readable program code means for causing a computer to monitor comprises computer readable program code means for causing a computer to monitor the current number of instances of the application for rising above the maximum number of instances for at least a predetermined amount of time.

14. The article of manufacture of claim 13, further comprising computer readable program code means for causing a computer to decrease the current number of instances running in the computing environment when the current number of instances rises above the maximum number of instances for at least the predetermined amount of time.

15. An article of manufacture, comprising:

at least one computer usable medium having computer readable program code means for causing the controlling of a number of instances of an application running in a computing environment, the computer readable program code means in said article of manufacture comprising:

computer readable program code means for causing a computer to monitor a current load on an application running in the computing environment, wherein the current load comprises at least one indicator of a level of usage of available instances of the application, and wherein the computer readable program code means for causing a computer to monitor comprises computer readable program code means for causing a computer to monitor the current number of instances of the application;

computer readable program code means for causing a computer to alter the current number of instances of the application running in the computing environment based on results of the monitoring;

computer readable program code means for causing a computer to specify at least one of a maximum number and a minimum number of instances of the application;

wherein the computing environment comprises a clustered environment, wherein the clustered environment comprises a cluster manager, wherein the application is associated with a resource manager, wherein the computer readable program code means for causing a computer to monitor comprises the resource manager, the article of manufacture further comprising computer readable program code means for causing a computer to provide the current load to the cluster manager; and computer readable program code means for causing a computer to alter the current number of instances of the application based on comparing the current load to one of the maximum number of instances and the minimum number of instances, wherein the computer readable program code means for causing a computer to alter and compare comprises the cluster manager.

* * * * *